(12) United States Patent
Rübhausen

(10) Patent No.: US 6,612,829 B2
(45) Date of Patent: Sep. 2, 2003

(54) EXTRUSION DIE

(75) Inventor: Anton Rübhausen, Niederkassel (DE)

(73) Assignee: Reifenhäuser GmbH & Co. Maschinenfabrik, Troisdorf (DE)

( * ) Notice: Subject to any disclaimer, the term of this patent is extended or adjusted under 35 U.S.C. 154(b) by 0 days.

(21) Appl. No.: 09/994,317

(22) Filed: Nov. 26, 2001

(65) Prior Publication Data

US 2002/0197348 A1 Dec. 26, 2002

(30) Foreign Application Priority Data

Jun. 20, 2001 (DE) .......................... 101 29 627

(51) Int. Cl.⁷ ................................................ B29C 47/16
(52) U.S. Cl. ...................... 425/381; 425/465; 425/466
(58) Field of Search ............................... 425/141, 190, 425/192 R, 381, 465, 466

(56) References Cited

U.S. PATENT DOCUMENTS 3,264,686 A * 8/1966 Soloduk ..................... 425/466
5,679,383 A * 10/1997 Ryan et al. ................. 425/141
5,962,041 A * 10/1999 Ryan et al. ................. 425/466
6,017,207 A * 1/2000 Druschel .................... 425/141
6,287,105 B1 * 9/2001 Druschel et al. ............ 425/466

FOREIGN PATENT DOCUMENTS

DE 94 22 051 11/1997
EP 668 143 10/1998

* cited by examiner

*Primary Examiner*—Tim Heitbrink
*Assistant Examiner*—Joseph Leyson
(74) *Attorney, Agent, or Firm*—Pauley Petersen Kinne & Erickson

(57) ABSTRACT

An extrusion die having a first die element and a second die element, each of which has a die lip, between which an extrusion gap with a slot-shaped outlet opening extends over a width of the extrusion die. At least one die element has an adjusting device by which the die lip can be adjusted in relation to the die lip of the other die element while changing the width of the outlet opening. The adjusting device has an adjusting bar arranged in a receiving groove of the die element and displaceable in the width extension thereof in a displacement device.

14 Claims, 5 Drawing Sheets

EXTRUSION DIE

BACKGROUND OF THE INVENTION

1. Field of the Invention

This invention relates to an extrusion die, having a first die element and a second die element, each of which has a die lip, between which an extrusion gap with a slot-shaped outlet opening extends over the width of the extrusion die, wherein at least one die element has an adjusting device by which the die lip can be adjusted in relation to the die lip of the other die element while changing a width of the outlet opening. The adjusting device has an adjusting bar arranged in a receiving groove of the die element and displaceable in the width extension thereof in a displacement device, which bar has at least one sliding cam laterally projecting past the adjusting bar. Each sliding cam is guided in a control groove of the die element, wherein the control groove is arranged to run obliquely with respect to the displacement direction of the adjusting bar, so that when the adjusting bar is displaced in the displacement direction, with the engagement of the at least one sliding cam in the control groove it is possible to achieve a displacement of the die lip extending transversely to it.

2. Description of Related Art

Because of the slot-shaped outlet opening extending across the width of the extrusion die, such extrusion dies are often called slot dies and are used for the extrusion of flat foils, flat sheets and flat panels, as well as for extrusion coating.

While the width of the foil, sheet, panel or coating on the basis of thermoplastic material extruded by the extrusion die is fixed by a width of the outlet opening, there are adjusting devices that vary the width of the outlet opening, for example the dimension perpendicularly to the width of the extrusion die, for changing the thickness of the plastic strand coming out of the extrusion die.

An adjusting device of the species with an adjusting bar, which is seated, displaceable in the width of the extrusion die, and with projecting sliding cams engage control grooves of the die element in order to cause an adjustment of the width of the outlet opening, is known from German Patent Reference DE 94 22 051 U1 and European Patent Reference EP 0668 143 B1. This is a so-called flex-lip, wherein the die lip to be adjusted is fastened flexibly and bendable on the die element and is bent more or less in the direction of the other die lip by the adjusting device for setting the outlet opening. In this known embodiment the adjusting bar is guided, directly adjustable, in an appropriate receiving groove of the die element, and the protruding or projecting sliding cams are directly guided in appropriate control grooves. However, in actual use large frictional forces are generated by this direct guidance of the adjusting bar and the sliding cams in the respective receiving groove or the control grooves which, to assure correct functioning, requires even and adequate lubrication of the faces sliding off on each other. This requires considerable maintenance and cannot always be maintained over an extended use time and can lead to increased wear of the adjusting device. In actual use this results because in the course of extensive usage of the known adjusting device and/or large dimensions of the extrusion die the actuating forces for causing the desired adjusting movement increase beyond sensible and manageable threshold values.

SUMMARY OF THE INVENTION

It is one object of this invention to provide an extrusion die with an adjusting device of the type mentioned above but so that it is possible, even with continuous operation and/or with large extrusion die dimensions, to achieve a smooth-running and dependable adjustment of the die lips, along with reduced maintenance outlay, wherein an easy adjustment during operation is particularly possible.

This object is achieved with further development of an extrusion die as discussed in the claims and this specification.

In accordance with this invention, the adjusting bar and/or at least one sliding cam of the adjustment bar are arranged, respectively with the interposition of a roller chain, in the receiving groove or control groove.

The direct sliding off of the adjusting bar or its projecting sliding cam in the receiving groove or the control groove of the die element is thus prevented and the desired mobility is provided by the roller chains. The roller chains, preferably arranged between the adjusting bar and the receiving groove, as well as between the sliding cam and the control grooves, provide a smooth-running displaceability of the adjusting bar and a resultant smooth-running adjustment of the width of the outlet opening of the extrusion die, even with a large size of the extrusion die and/or over large adjustment distances.

The adjusting device of this invention, having roller chains arranged between the adjustment bar and the receiving groove and/or between the projecting sliding cam and the control groove, can be used in connection with various known designs of so-called slot extrusion dies.

In one embodiment of the extrusion die of this invention, a so-called adjusting lip, wherein the die element having the adjusting device is embodied in several parts and with a rear die element and a front die element, which is attached to the front of the latter and contains the die lip, and is displaceable with respect to the rear die element by the adjusting device while changing the width of the outlet opening of the extrusion gap. In contrast to adjustment by flexibly attached tool lips, an adjustment of the extrusion gap by a displaceable tool lip has one advantage that the flow surfaces of the extrusion gap providing the shaping remain parallel with each other over the entire adjustment range. Large adjustment ranges, and therefore large adjustable areas for the width of the outlet opening of the extrusion gap, can be set by an extrusion die having an adjusting lip, wherein the adjusting forces are reduced by the roller chains in accordance with this invention.

It is possible during continuous operation to adjust the extrusion die of this invention on demand.

In this case the receiving groove for receiving the adjusting bar is preferably formed in the rear die element and is open toward the front die element. The control grooves for receiving the sliding cams of the adjusting bar are formed in the front die element on the side resting against the rear die element. However, this embodiment is not mandatory and can be changed. For example, the adjusting bar can be housed in a receiving groove in the front die element while the control grooves receiving the projecting sliding grooves are housed in the rear die element. It is also possible for the adjusting bar to have control cams in lieu of projecting sliding cams, which are engaged by correspondingly embodied projecting sliding cams at the front die element or rear die element.

In another embodiment of the extrusion die in accordance with this invention, in the so-called flex-lip style, wherein the die element with the adjusting device has a die lip arranged on it in a flexible and bendable manner, and wherein bending of the die lip by the adjusting device and an accompanying change in the size of the outlet opening of the extrusion die can be achieved. Such flex-lip extrusion dies are known in many forms, and reference is made merely by way of example to German Patent Reference DE 94 22 051 U1 and European Patent Reference EP 0 668 143 B1.

The structure of the roller chains arranged between the adjusting bar and the receiving groove and/or between the sliding cam and the control groove is important for the function of the extrusion die of this invention.

The roller chains are preferably designed endlessly revolving, so that their friction-reducing and function-enhancing properties are available over an entire adjustment range of the extrusion die of this invention.

In one embodiment of the roller chains of this invention, a plurality of respective rollers are rotatably seated in the lateral members, on which the adjusting bar in the receiving groove, or the at least one sliding cam in the associated control groove, roll off in relation to each other. The rollers rotatably seated in the lateral members are chained together at their respective ends with lateral members in a known manner.

To assure a sufficient stability of the roller chains of the extrusion die of this invention, there are connecting bridges which connect the respective lateral members of the roller chain with each other, in areas between adjoining rollers.

In order to be able to permanently absorb the expected high displacement forces, the roller chains are preferably manufactured from suitable hardened steel or other material suitable for the load.

With the extrusion die in accordance with this invention, it is possible to adjust the width of the outlet opening up to 12 mm.

It is also possible within the scope of this invention to use different chain forms.

BRIEF DESCRIPTION OF THE DRAWINGS

Further details of the extrusion die in accordance with this invention are explained in detail in view of the drawings, wherein.

DESCRIPTION OF PREFERRED EMBODIMENTS

Figure 1:
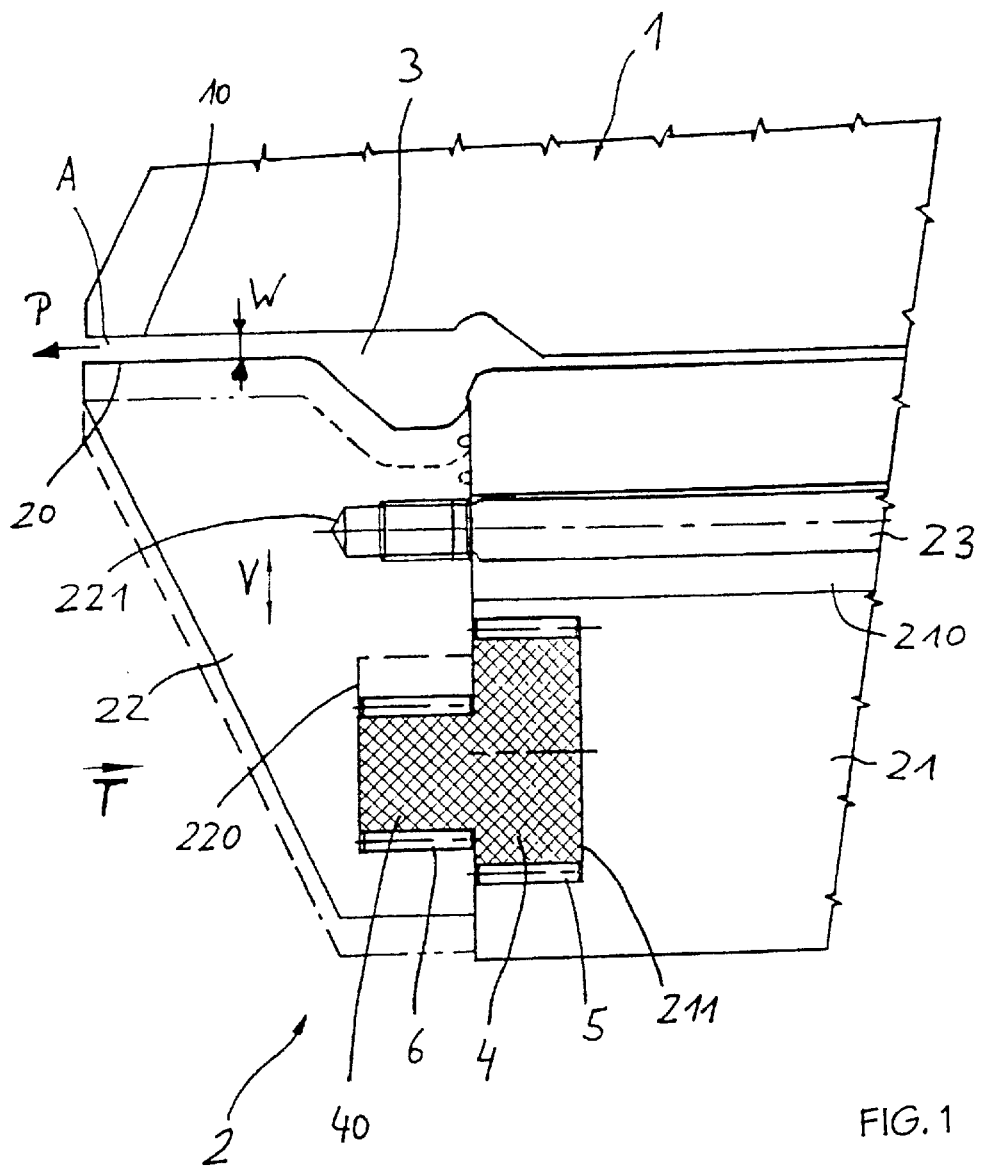
FIG. 1 is a schematic lateral view of an extrusion tool in accordance with this invention.

An extrusion die, also called a slot extrusion die and used, inter alia, for extruding flat foils, flat sheets and flat panels, as well as for extrusion coating, using thermoplastic materials melted in an extrusion device, is shown in FIG. 1.

The extrusion die comprises a first, or upper, die element 1, and a second, or lower, die element 2, between which an extrusion gap 3 is formed and through which a melt of the thermoplastic material made available by an extrusion device, not shown, is conducted to an outlet opening A and there discharges the extrusion die in accordance with the arrow P. The outlet opening A is embodied as a slot and extends over an entire width of the extrusion tool.

To change the size of the outlet opening A, its width W can be changed. An adjusting device is used for this purpose, which is explained in greater detail. The distance between the die lips 10, 20 of the first die element 1, or of the second die element 2, which delimit the outlet opening A, and which also form the width W, can be changed.

To form this adjusting device, the second, and as shown the lower die element 2 is embodied in several parts and comprises a rear die element 21, on whose front a front die element 22 is arranged, which supports the die lip 20. Thus, a plurality of tension rods 23 are screwed from the direction of the rear die element 21 through an appropriate bore 210 therein into a threaded blind bore 221 in the front die element 22 and create a surface pressure required for sealing the joint between the rear die element 21 and the front die element 22.

Figure 2:
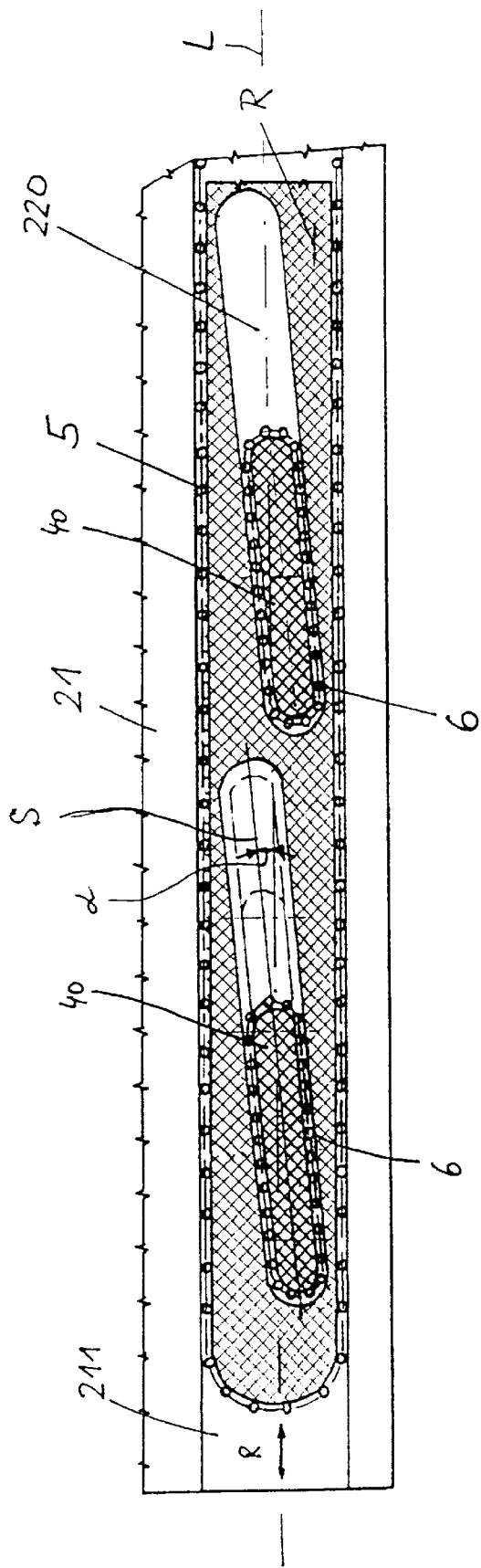
FIG. 2 is a partial sectional view of the extrusion tool in accordance with the arrow T shown in FIG. 1.

Beneath the bores 210 for the passage of the tension rods 23, the rear die element 21 has a receiving groove 211 of rectangular cross section, which is open toward the front die element 22 and into which an adjusting bar 4 is inserted which, the same as the receiving groove 211, extends over the width of the extrusion die, as also shown in FIG. 2. In this case the adjusting bar 4 is seated within the receiving groove 211 with the interposition of an endless revolving roller chain 5, so that it is guided inside the receiving groove 211, longitudinally displaceable in a displacement direction according to the arrow R, which also extends over the width of the extrusion tool. This longitudinal displacement capability can be caused, for example, by a threaded spindle, not shown, which also extends over the width of the extrusion die and acts on the adjusting bar 4.

As shown in FIG. 1 and FIG. 2, on its side facing the front die element 22 the adjusting bar 4 has several projecting sliding cams 40 which extend parallel with each other and are spaced apart from each other and protrude over the contour of the rear die element 21. The sliding cams 40 have a center longitudinal axis S extending obliquely with respect to the longitudinal axis L of the adjusting bar 4 and the receiving groove 211 receiving it, in this case at an angle $\alpha$ of 5°, for example.

The projecting sliding cams 40 of the adjusting bar 4 are guided in appropriately embodied control grooves 220, which are cut into the front die element 22, starting at the surface facing the rear die element 21, which are also shown in FIG. 2. Analogously to the sliding cams 40 of the adjusting bar 4, the control grooves 220 are also arranged obliquely at the same angle $\alpha$ with respect to the longitudinal axis L of the adjusting bar 4 and the receiving groove 211.

The sliding cams 40 are received and guided within the control grooves 220, also with the respective interposition of a roller chain 6 endlessly revolving around the sliding cams and guided within the control groove 220.

With this previously explained embodiment of the extrusion die it is possible to transform a longitudinal movement of the adjusting bar 4 in accordance with the arrow R in the direction of the longitudinal axis L into a movement of the front die element 22 with respect to the rear die element 21, which extends perpendicularly thereto in the direction of the arrow V in FIG. 1, because the projecting sliding cams 40 are continuously guided inside the control grooves 220 and roll off in it by means of the roller chains 6. Here, the degree of vertical movement in the direction of the arrow V resulting from the displacement of the adjusting bar 4 in the direction of the arrow R is a function of the angle $\alpha$ between the longitudinal axis S of the sliding cams 40, as well as of the control grooves 220, with respect to the longitudinal axis L of the adjusting bar 1 and the receiving groove 211.

As a result of the vertical displacement of the front tool element 22 by means of the movement of the adjusting bar 4 in the direction of the arrow R it is possible to vary the distance of the die lip 20 embodied on the front die element 22 in relation to the die lip 10 of the die element 1, and thus the width W of the outlet opening A of the extrusion die can be changed in a simple manner.

The entire guidance of the adjusting bar 4 inside the receiving groove 211, as well as that of the projecting sliding grooves 40 inside the control grooves 220, occurs by means of the roller chains 5, 6, through which all forces coming from the adjusting bar 4 and the sliding cams 40 are introduced into the rear die element 21, or the front die element 22. Thus this adjustment movement can be performed with little exertion of force and almost free of wear and need for maintenance, even during continuous operation and even with large dimensions of the extrusion die and/or under high pressure forces between the rear die element 21 and the front die element 22 because of the tension rods 23, and/or under great pressure from the thermoplastic material in the flow conduit 3. A sufficient movement capability of the front end fastened on the rear die element 21 by means of the tension rods 23 is possible due to a correspondingly generous size of the bores 210 for the passage of the tension rods 23.

The roller chains 5, 6 are preferably identically constructed, but can also have different dimensions. The further structure of the roller chains 5, 6 is explained by example of the roller chain 5 described in FIGS. 3 to 5, and the explanations can also be analogously applied to the roller chain 6. The roller chain described is merely one possible embodiment, by means of which a roller seating of the components in the sense of the invention can be realized.

Alternative embodiments are also possible for the roller chain, which meet the requirements of a desired endless lineup of parallel rollers, which are individually freely rotatable, for example flexible sheet metal cages, hingedly connected sheet metal cages.

Figure 3:
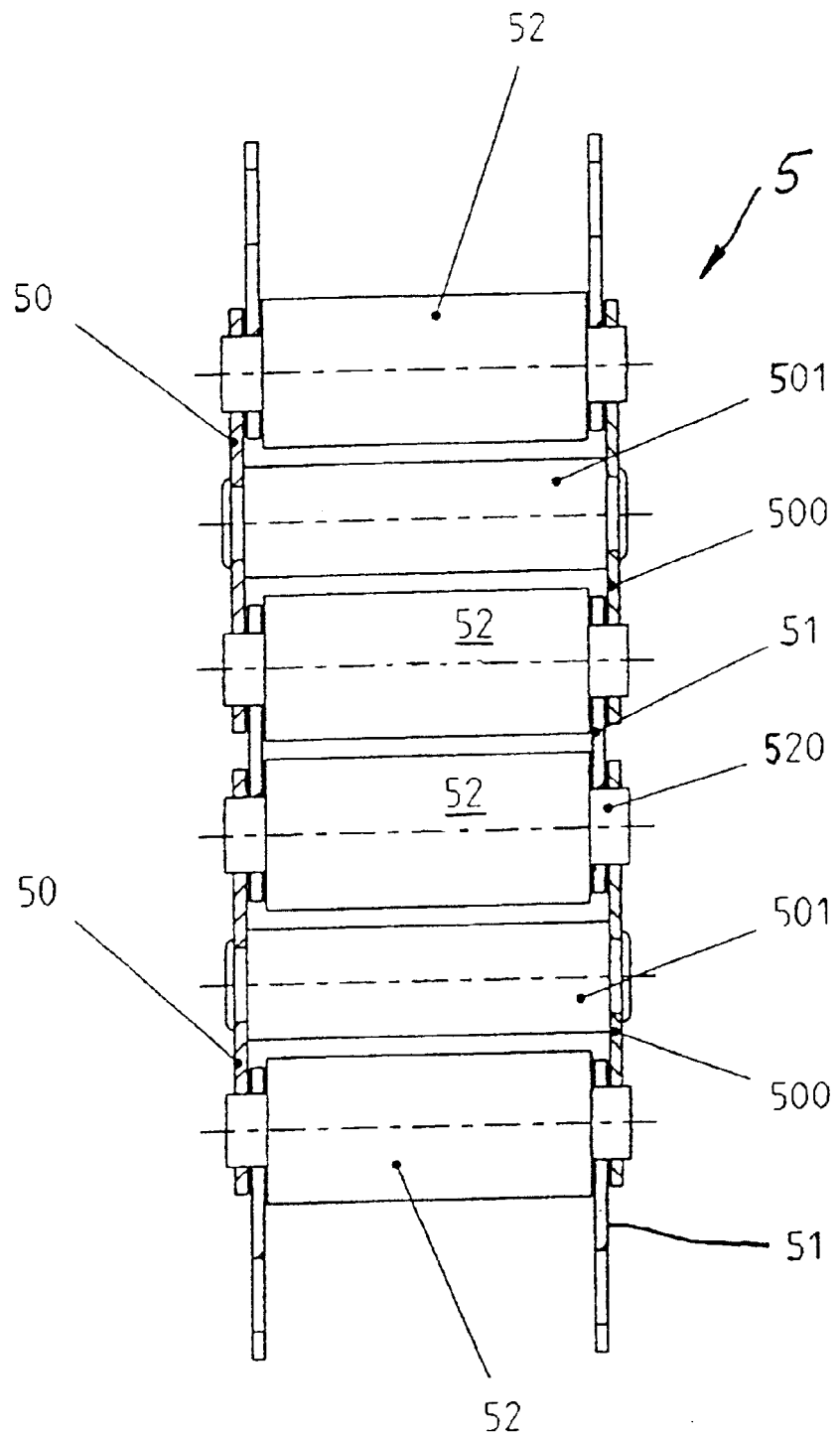
FIG. 3 is a top view on the roller chain of the extrusion die in accordance with this invention.
Figure 4:
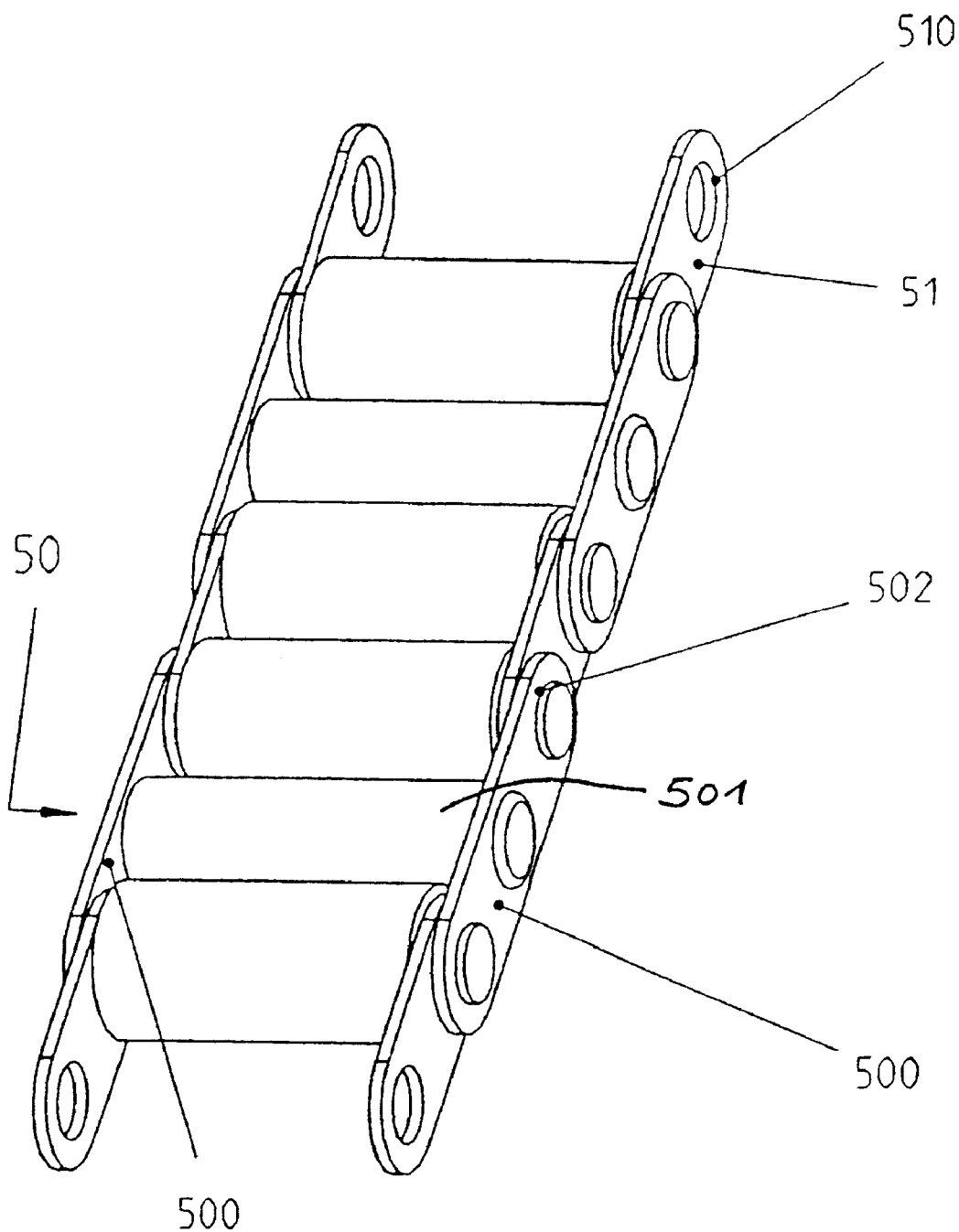
FIG. 4 is a perspective view of details of the roller chain in accordance with FIG. 3.
Figure 5:
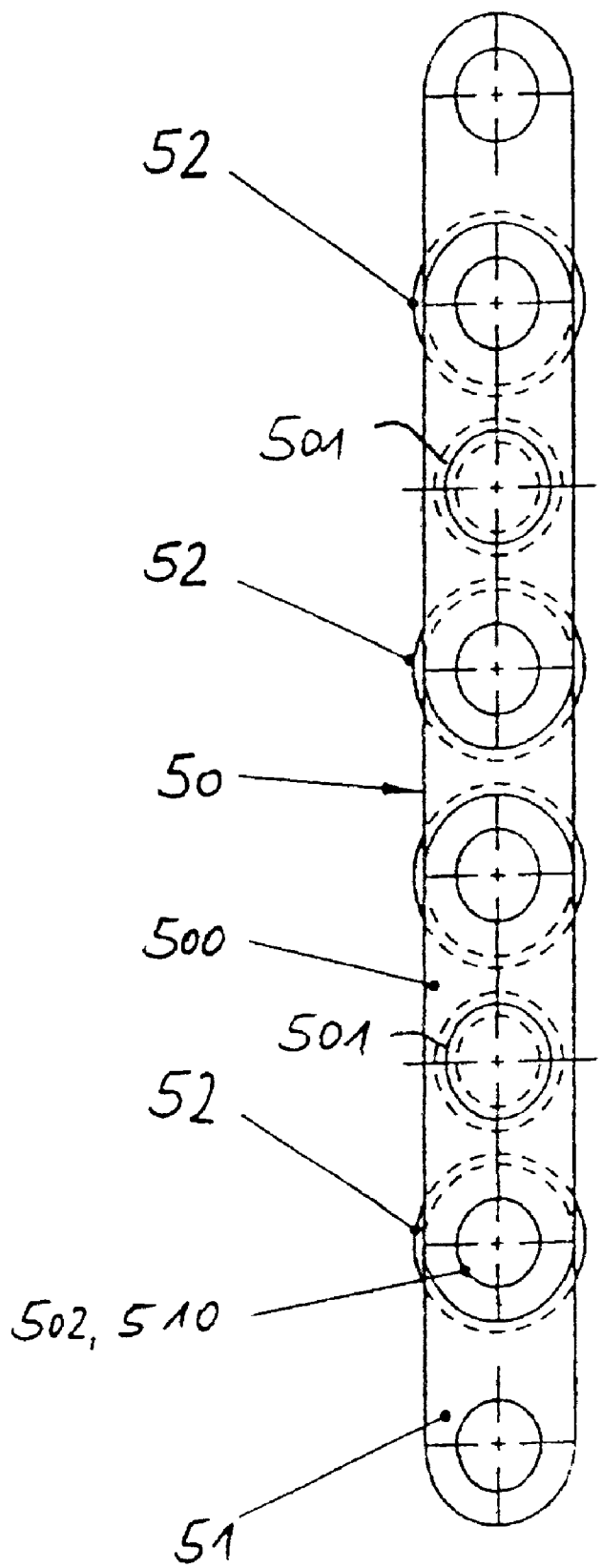
FIG. 5 is a lateral view of the roller chain in accordance with FIG. 3.

As shown in FIG. 3, the roller chain 5 has a plurality of rollers 52 extending parallel with respect to each other, on which the adjusting bar 4, or the sliding cams 40 roll off inside the receiving groove 211, or the control groove 220. Each of the rollers 52 has bearing journals 520 at the front, which are rotatably seated in the lateral members 51 and 500. The rollers 52 are alternately chained together by means of lateral members 51, or 500, of a chain support member 50 to form a roller chain, wherein the lateral members 51, or 500, of the support member 50 have corresponding bores 510, 502, which receive the free ends of the support shafts 520 and communicate with each other, as shown in FIG. 4. Alternatingly between successive lateral members 51, there is a respective support member 50, as shown in FIG. 4. Each one of the support members 50 has the lateral members 500 acting together with the lateral members 51 and a connecting bridge 501 which connects the two lateral members 500 of the support member 50 which are located on both sides of the roller chain 5 between two successive rollers 52, which lends a high stability to the roller chain 5. A diameter of the connecting bridge 501 is less than that of the rollers 52, so that it does not contact the adjusting bar 4 and the receiving groove 211, or the sliding cam 40 and the control groove 220, also as shown in FIG. 5.

The roller chain 5, as well as the analogously constructed roller chain 6, are made of a wear-resistant material, for example hardened steel, selected in accordance with the requirements.

Besides the embodiment shown in the drawings of an extrusion die with an adjusting lip, for example with a front die element 22, which is attached to a rear die element 21 and supports the die lip 20, the adjusting bar 4 seated on roller chains and having sliding cams and control grooves receiving the latter, is possible with an extrusion die with a so-called flex lip, wherein the die lip is fastened, flexibly and bendable on the die element.

What is claimed is:

1. In an extrusion die having a first die element and a second die element each having a die lip between which an extrusion gap with a slot-shaped outlet opening extends over a width of the extrusion die, wherein at least one of the first and second die elements has an adjusting device for adjusting one die lip relative to another die lip while changing the width of the outlet opening, the adjusting device having an adjusting bar arranged in a receiving groove of one of the first and second die elements and displaceable in a width extension in a displacement device, the adjusting bar having at least one sliding cam laterally projecting beyond the adjusting bar, and each sliding cam guided in a control groove of one of the first and second die elements, wherein the control groove runs obliquely with respect to a displacement direction of the adjusting bar, so that when the adjusting bar is displaced in the displacement direction with engagement of the at least one sliding cam in the control groove the die lip extending transversely is displaced, the improvement comprising: at least one of the adjusting bar (4) and the at least one sliding cam (40) of the adjustment bar (4) arranged respectively with interposition of a roller chain (5, 6) in one of the receiving groove (211) and the control groove (220) of the die element (2).

2. In the extrusion die in accordance with claim 1, wherein the die element (2) having the adjusting device is formed in a plurality parts and with a rear die element (21) and a front die element (22) attached to a front of the rear die element (21) and has the die lip (20) and is displaceable with respect to the rear die element (21) by the adjusting device while changing the width of the outlet opening.

3. In the extrusion die in accordance with claim 2, wherein the receiving groove (211) for receiving the adjusting bar (4) is formed in the rear die element (21) and is open toward the front die element (22), and the control grooves (220) for receiving the sliding cams (40) of the adjusting bar (4) are formed in the front die element (22) on a side resting against the rear die element (21).

4. In the extrusion die in accordance with claim 1, wherein one of the first and second die elements having the adjusting device has the die lip on which it is arranged in a flexible and bendable manner, and wherein bending of the die lip by the adjusting device and an accompanying change in the size of the outlet opening of the extrusion die is achieved.

5. In the extrusion die in accordance with claim 4, wherein the roller chains (5, 6) are endlessly revolving.

6. In the extrusion die in accordance with claim 5, wherein the roller chains (5, 6) each comprise a plurality of rollers (52) which are rotatably seated by bearing journals (520), and the rollers are chained together by lateral members (500, 51).

7. In the extrusion die in accordance with claim 6, wherein a connecting bridge (501) which connects the lateral members (500) of the roller chain (5, 6) is in an area between adjoining ones of the rollers (52).

8. In the extrusion die in accordance with claim 7, wherein the roller chains (5, 6) are made of hardened steel.

9. In the extrusion die in accordance with claim 8, wherein the width of the outlet opening of the extrusion gap can be adjusted up to 12 mm.

10. In the extrusion die in accordance with claim 1, wherein the roller chains (5, 6) are endlessly revolving.

11. In the extrusion die in accordance with claim 1, wherein the roller chains (5, 6) each comprise a plurality of rollers (52) which are rotatably seated by bearing journals (520), and the rollers are chained together by lateral members (500, 51).

12. In the extrusion die in accordance with claim 11, wherein a connecting bridge (501) which connects the lateral members (500) of the roller chain (5, 6) is in an area between adjoining ones of the rollers (52).

13. In the extrusion die in accordance with claim 1, wherein the roller chains (5, 6) are made of hardened steel.

14. In the extrusion die in accordance with claim 1, wherein the width of the outlet opening of the extrusion gap can be adjusted up to 12 mm.

\* \* \* \* \*